United States Patent
Chen et al.

(10) Patent No.: US 10,827,467 B2
(45) Date of Patent: *Nov. 3, 2020

(54) SELECTING A CELL IDENTIFIER BASED ON A DOWNLINK CONTROL INFORMATION

(71) Applicant: QUALCOMM Incorporated, San Diego, CA (US)

(72) Inventors: Wanshi Chen, San Diego, CA (US); Stefan Geirhofer, Brooklyn, NY (US); Peter Gaal, San Diego, CA (US); Tao Luo, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 15/912,518

(22) Filed: Mar. 5, 2018

(65) Prior Publication Data

US 2018/0206219 A1 Jul. 19, 2018

Related U.S. Application Data

(63) Continuation of application No. 13/794,757, filed on Mar. 11, 2013, now Pat. No. 9,924,498.

(Continued)

(51) Int. Cl.
*H04W 72/04* (2009.01)
*H04W 48/20* (2009.01)
(Continued)

(52) U.S. Cl.
CPC ....... *H04W 72/0406* (2013.01); *H04L 1/0028* (2013.01); *H04L 1/1861* (2013.01);
(Continued)

(58) Field of Classification Search
None
See application file for complete search history.

(56) References Cited

U.S. PATENT DOCUMENTS 8,194,603 B2 6/2012 Nimbalker et al.
2010/0260130 A1 10/2010 Earnshaw et al.
(Continued)

FOREIGN PATENT DOCUMENTS

CN 102263623 A 11/2011
EP 2182689 A2 5/2010
(Continued)

OTHER PUBLICATIONS

International Search Report and Written Opinion—PCT/US2013/030619—ISA/EPO—dated Nov. 21, 2013.
(Continued)

*Primary Examiner* — Jason E Mattis
*Assistant Examiner* — Hong Shao
(74) *Attorney, Agent, or Firm* — Arent Fox, LLP

(57) ABSTRACT

A method, an apparatus, and a computer program product for wireless communication are provided in which a cell identifier is selected based on one or more properties associated with received downlink control information (DCI), where the properties may not be exclusively associated with determining a cell identifier. The cell identifier may be selected from a plurality of cell identifiers received through radio resource control signaling. The properties of the DCI may include a type of download control channel, a type of subframe and a type of DCI format used to provide the DCI.

49 Claims, 15 Drawing Sheets

Related U.S. Application Data

(60) Provisional application No. 61/609,924, filed on Mar. 12, 2012.

(51) Int. Cl.
    *H04L 1/00* (2006.01)
    *H04L 1/18* (2006.01)
    *H04L 27/26* (2006.01)
    *H04W 48/10* (2009.01)

(52) U.S. Cl.
    CPC ........... *H04W 48/20* (2013.01); *H04L 1/0026* (2013.01); *H04L 27/2613* (2013.01); *H04W 48/10* (2013.01)

(56) References Cited

U.S. PATENT DOCUMENTS

| | | |
|---|---|---|
| 2010/0331030 A1 | 12/2010 | Nory et al. |
| 2011/0002290 A1 | 1/2011 | Kim et al. |
| 2011/0019776 A1 | 1/2011 | Zhang et al. |
| 2011/0038310 A1 | 2/2011 | Chmiel et al. |
| 2011/0235597 A1 | 9/2011 | Montojo et al. |
| 2011/0268080 A1 | 11/2011 | Luo et al. |
| 2012/0113941 A1 | 5/2012 | Chung et al. |
| 2012/0127913 A1 | 5/2012 | Lin et al. |
| 2012/0176884 A1 | 7/2012 | Zhang et al. |
| 2012/0195267 A1 | 8/2012 | Dai et al. |
| 2012/0195271 A1 | 8/2012 | Lee et al. |
| 2012/0327783 A1 | 12/2012 | Moon et al. |
| 2013/0003788 A1 | 1/2013 | Marinier et al. |
| 2013/0039284 A1 | 2/2013 | Marinier et al. |
| 2013/0208665 A1 | 8/2013 | Baldemair et al. |
| 2013/0235821 A1 | 9/2013 | Chen et al. |
| 2014/0204854 A1 | 7/2014 | Freda et al. |
| 2015/0016385 A1 | 1/2015 | Aiba et al. |
| 2015/0043457 A1 | 2/2015 | Liu et al. |
| 2018/0184411 A1 | 6/2018 | Chen et al. |

FOREIGN PATENT DOCUMENTS

| | | |
|---|---|---|
| EP | 2302830 A2 | 3/2011 |
| EP | 2482609 A1 | 8/2012 |
| JP | 2013500643 A | 1/2013 |
| JP | 2013187591 A | 9/2013 |
| TW | 201106661 A | 2/2011 |
| WO | 2011011975 A1 | 2/2011 |
| WO | 2011032342 A1 | 3/2011 |
| WO | 2011041552 A1 | 4/2011 |

OTHER PUBLICATIONS

Partial International Search Report—PCT/US2013/030619—ISA/EPO—dated May 21, 2013.
European Search Report—EP18205331—Search Authority—Munich—dated Jan. 18, 2019.

SELECTING A CELL IDENTIFIER BASED ON A DOWNLINK CONTROL INFORMATION

CROSS-REFERENCE TO RELATED APPLICATION(S)

The present application is a continuation of U.S. patent application Ser. No. 13/794,757, filed on Mar. 11, 2013, and entitled "Signaling of Virtual Cell Identifiers and Fallback Operation," which claims priority to U.S. Provisional Application Ser. No. 61/609,924, entitled "Signaling of Virtual Cell Identifiers and Fallback Operation" and filed on Mar. 12, 2012, each of which is expressly incorporated by reference herein in its entirety.

BACKGROUND

Field

The present disclosure relates generally to communication systems, and more particularly, to wireless communication systems may employ virtual cell identifiers.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain embodiments of the invention provide a method of communicating configuration information in a wireless communication system. In particular, a set of static or semi-static configuration parameters may be provided to user equipment. The user equipment may then select specific parameters based on signaling received during subsequent operation. The selection of specific parameters may be based on a signaled index value and may also be based on information derived from the format of downlink control information received by the user equipment.

The disclosed systems and methods enable the identification of virtual cell identifiers to be used by the user equipment and may also identify the methods by which the user equipment can communicate feedback and flow control information to a base station.

In an aspect of the disclosure, a method of wireless communications comprises receiving a signal including downlink control information (DCI), and selecting one of a plurality of cell identifiers based on one or more properties associated with the DCI. The one or more properties may not be exclusively associated with determining a cell identifier. The method may also include initializing a pseudo-random sequence generator based on the selected cell identifier. In an aspect of the disclosure, the method comprises receiving the plurality of cell identifiers via radio resource control (RRC) signaling.

In certain embodiments, the DCI is received in an enhanced physical download control channel (ePDCCH). The ePDCCH may be scrambled with an ePDCCH scrambling identifier. In some embodiments, the cell identifier may be selected by determining a type of format of the DCI, and selecting the selected cell identifier based on the ePDCCH scrambling identifier when the DCI has a type 1A format. In some embodiments, the cell identifier may be selected by determining a type of format of the DCI, and selecting a predetermined cell identifier when the DCI has a type 1A format.

In an aspect of the disclosure, the cell identifier may be selected by determining a subframe type in which the DCI is received, and determining whether the subframe is a Multi-Media Broadcast over a Single Frequency Network (MBSFN) subframe or a non-MBSFN subframe. The cell identifier may be selected, at least in part, based on the subframe type.

In an aspect of the disclosure, receiving a signal includes receiving the DCI in a first set of candidate control channels (CCEs) of at least two sets of CCEs, and the selected cell identifier is selected, at least in part, based on the set of CCEs in which the DCI is received. In some embodiments, the DCI includes an uplink grant, and the selected cell identifier is used for an uplink transmission corresponding to the uplink grant.

In an aspect of the disclosure, the method comprises providing channel state information (CSI) based on the selected cell identifier.

In an aspect of the disclosure, a method of wireless communications comprises receiving a signal including downlink control information (DCI) including an uplink grant, identifying a physical hybrid ARQ indicator channel (PHICH) in a control region when the grant is provided in a PDCCH, and identifying an enhanced PHICH in a data region when the grant is provided in a ePDCCH.

In an aspect of the disclosure, the method comprises selecting one of a plurality of cell identifiers based on a property associated with the DCI. The property may not exclusively related to determining a cell identifier.

In an aspect of the disclosure, the method comprises providing an acknowledgement or a negative acknowledgement based on the selected cell identifier.

In an aspect of the disclosure, a method of wireless communications comprises determining an index based on a format type of DCI, and selecting a set of parameters from a plurality of sets of the parameters based on the index. The set of parameters may define one or more characteristics of a virtual cell, and the plurality of sets of the parameters is configured through RRC signaling.

In an aspect of the disclosure, a method of wireless communications comprises initializing a pseudo-random sequence generator using one parameter of the selected set of parameters. The set of parameters may be used to define characteristics of an uplink communication channel.

DETAILED DESCRIPTION

Figure 1:
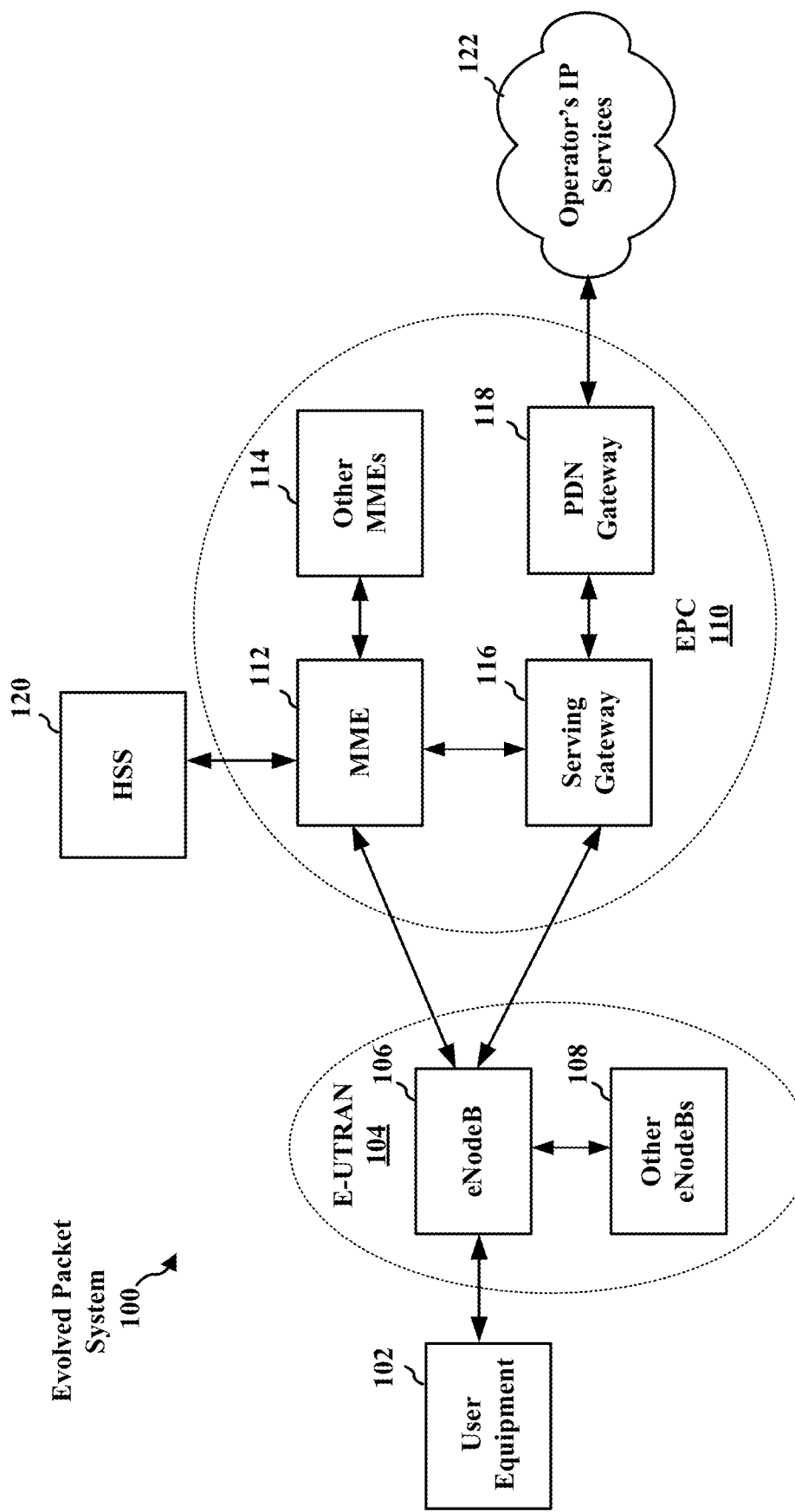
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipments (UEs) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
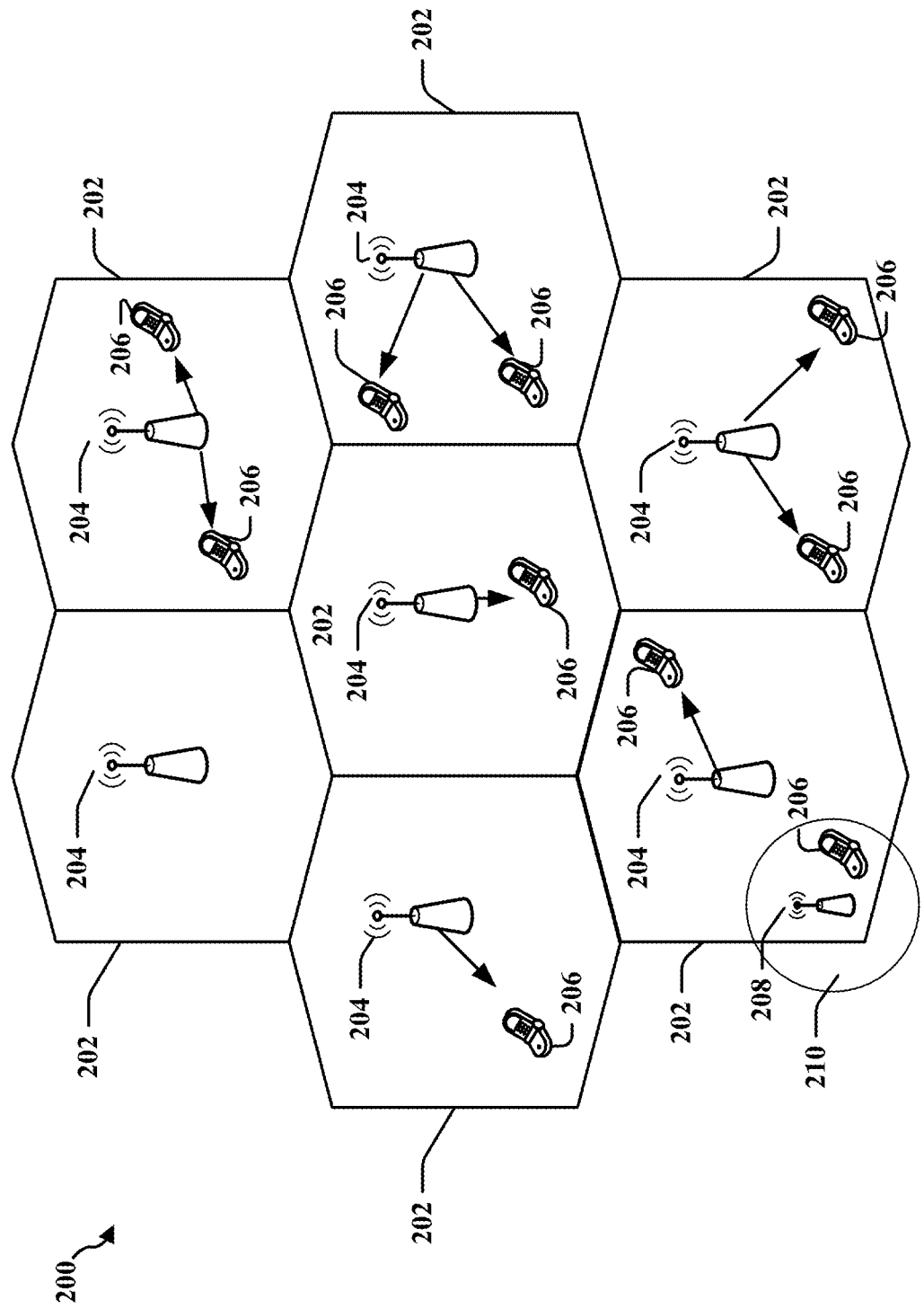
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially preceding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
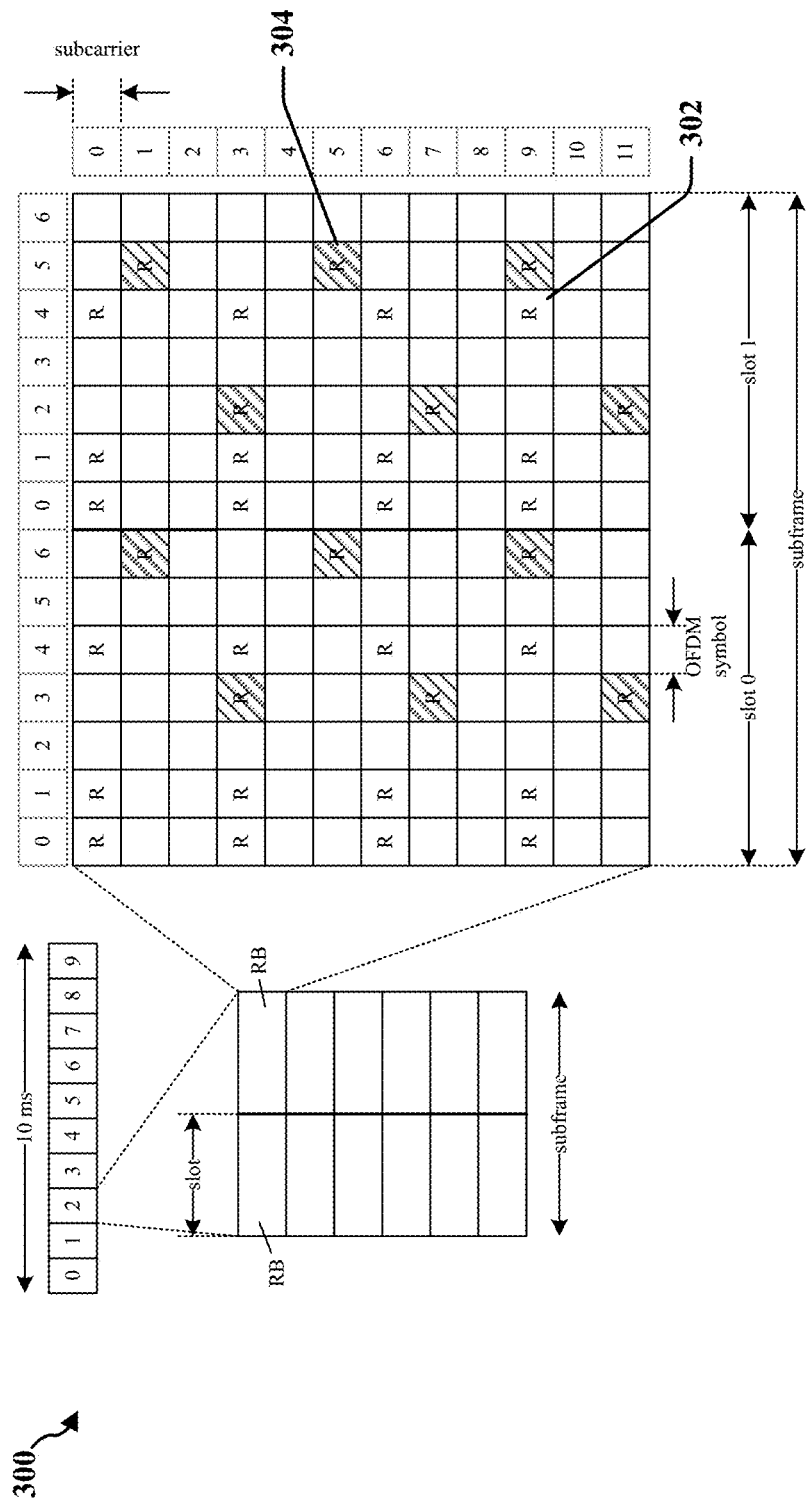
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
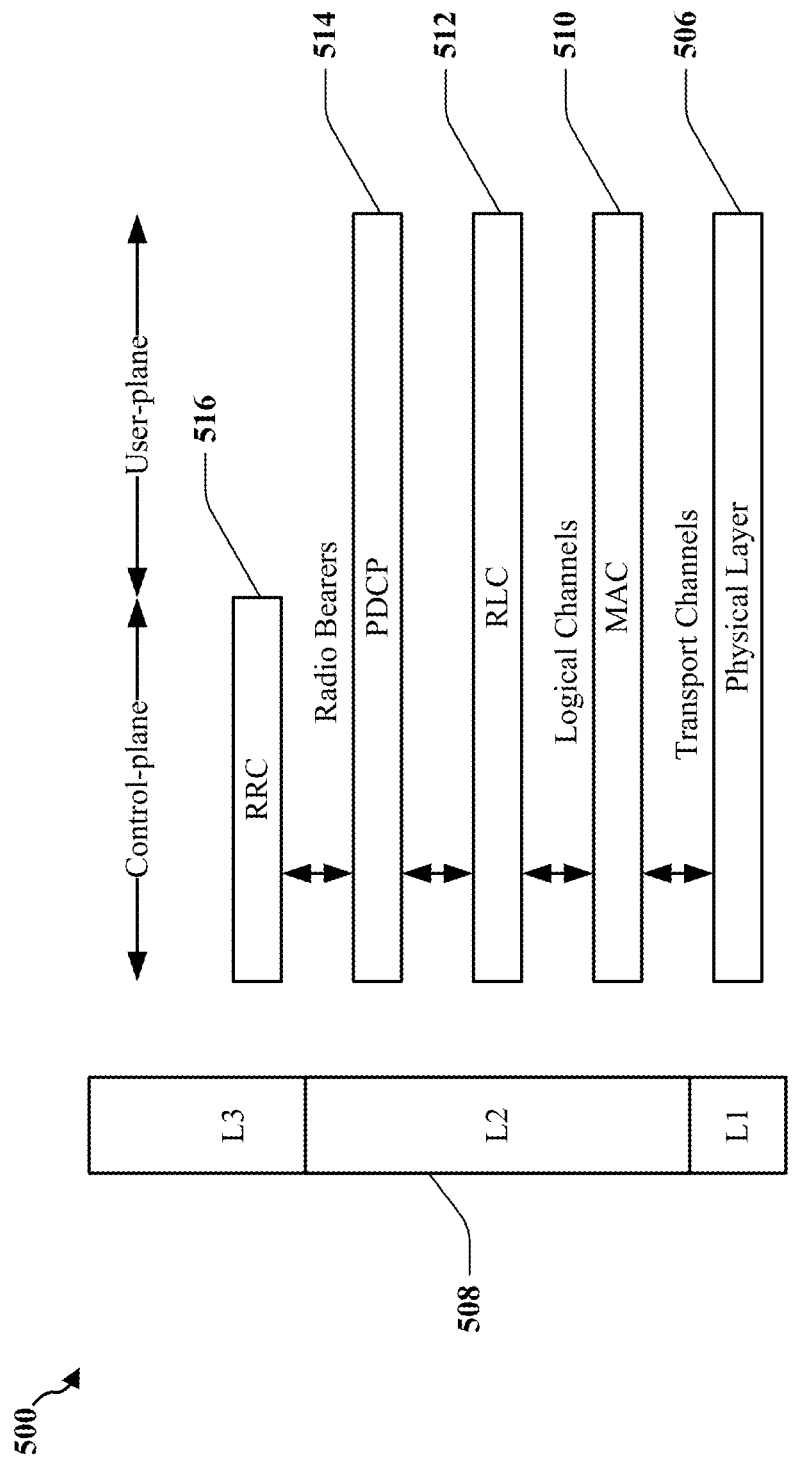
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the LIE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
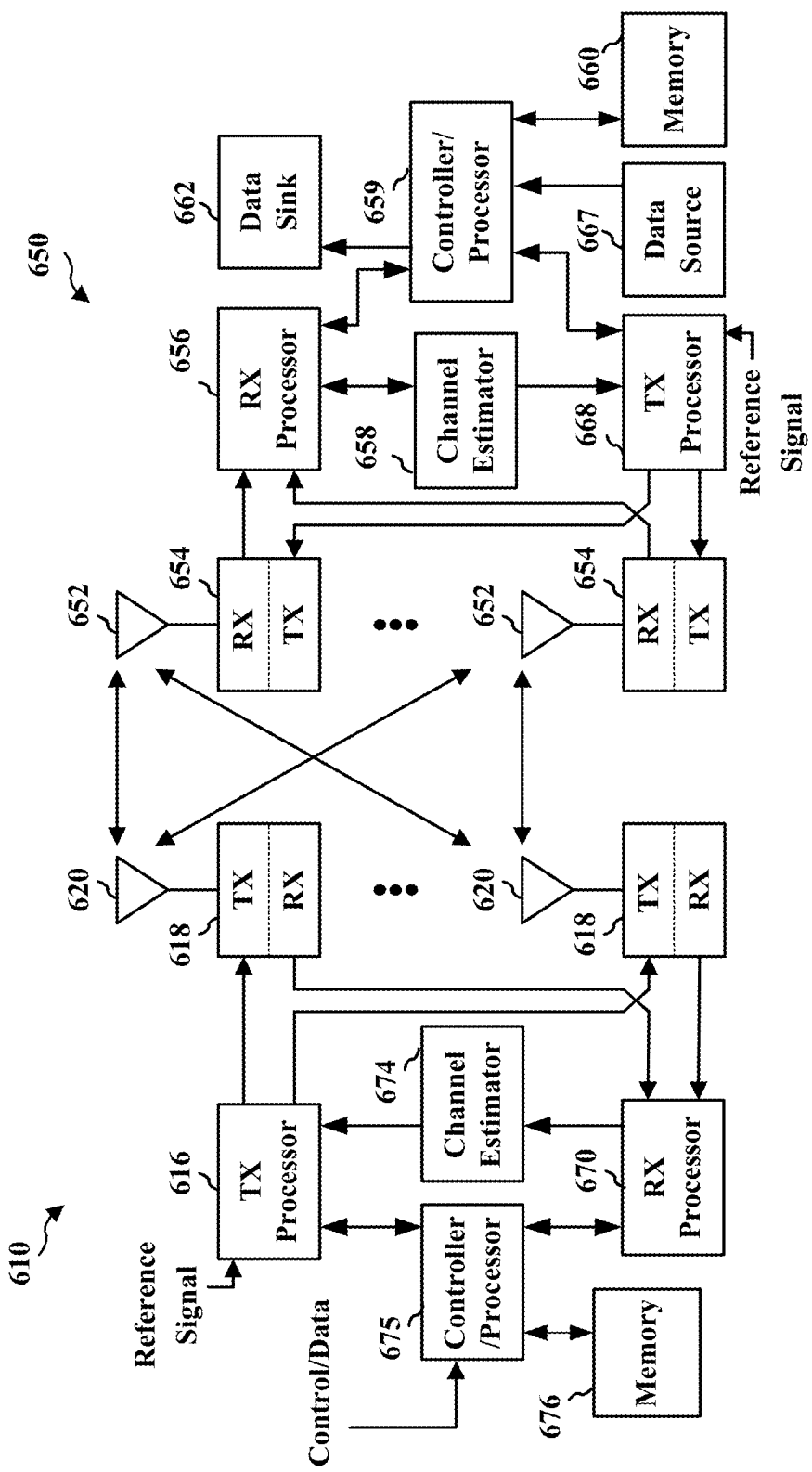
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shill keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
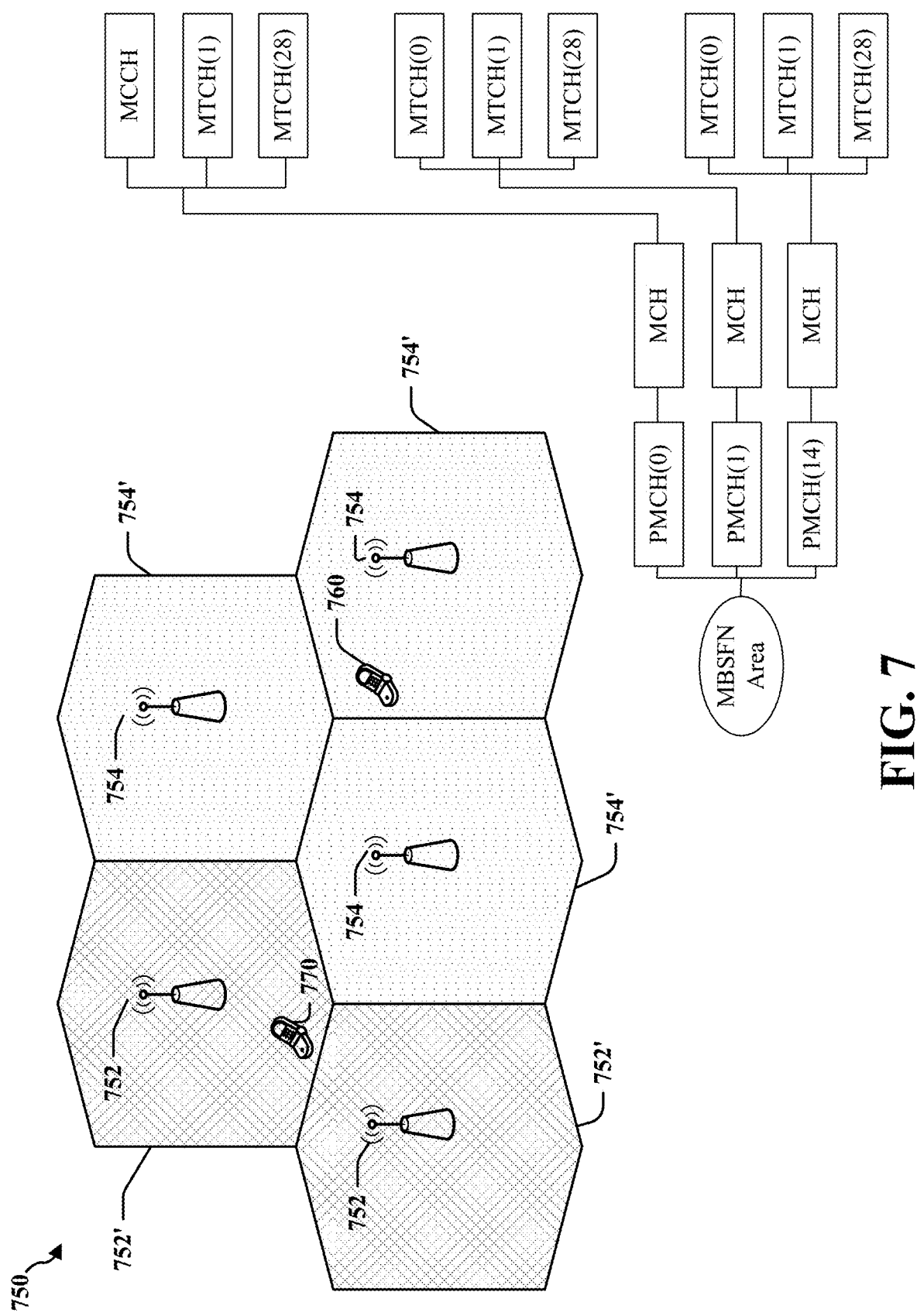
FIG. 7 is a diagram illustrating evolved Multicast Broadcast Multimedia Service in a Multi-Media Broadcast over a Single Frequency Network.

FIG. 7 is a diagram 750 illustrating evolved Multicast Broadcast Multimedia Service (eMBMS) in a Multi-Media Broadcast over a Single Frequency Network (MBSFN). The eNBs 752 in cells 752' may form a first MBSFN area and the eNBs 754 in cells 754' may form a second MBSFN area. The eNBs 752, 754 may be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

Figure 8:
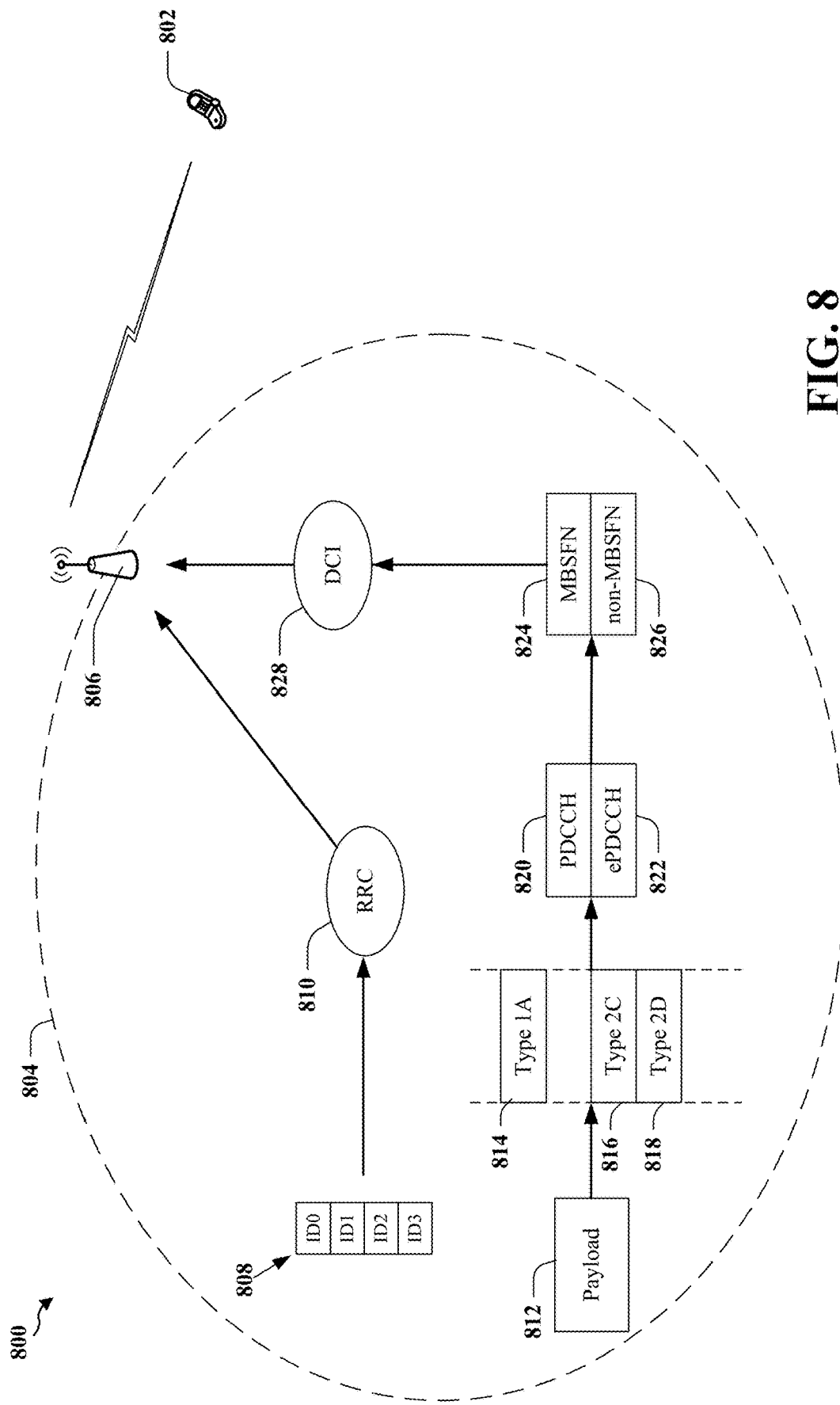
FIG. 8 is a diagram illustrating dynamic signaling of a wireless network configuration.

FIG. 8 is a diagram 800 illustrating a method of configuring a UE 802. An eNB 804 may signal, through transmitter 806, certain information, such as one or more virtual cell identifiers 808, to the UE 802 using RRC sublayer 810. Dynamic signaling may then be used to cause UE 802 to select one of virtual cell identifiers 808, or another cell identifier such as a predetermined and/or physical cell identifier. In some embodiments, the dynamic signaling provides an index that can be used to configure an aspect of UE 802 operation by selecting the cell identifier. In some embodiments, a dynamically signaled index may be used to access a set of statically or semi-statically defined parameters in the UE 802 that may configure individual operational aspects of a virtual cell.

Certain channels used for wireless communications may be scrambled using a scrambling sequence generator that is initialized using a cell identifier. For example, a demodulation reference signal (DM-RS) pseudo-random sequence generator may be initialized at the beginning of each subframe using a cell identifier $N_{ID}^{cell}$ using:

$$c_{init} = (\lfloor n_S/2 \rfloor + 1) \cdot (2N_{ID}^{cell} + 1) \cdot 2^{16} + n_{SCID},$$

where $n_S$ represents slot number, $N_{ID}^{cell}$, is the cell identifier for the serving cell and $n_{SCID}$ is a scrambling sequence number configured by the base station, which is dynamically conveyed to the UE 802, typically in DCI associated with a PDSCH transmission. The initialization value may be determined using a different function when virtual cell identifiers are used. For example, a pseudo random sequence generator may be initialized using a value where:

$$c_{init} = (\lfloor n_S/2 \rfloor + 1) \cdot (2X + 1) \cdot 2^{16} + n_{SCID}.$$

X is may be referred to as a virtual cell identifier, and may be a dynamically selected parameter.

Dynamic signaling may be used to select a virtual cell identifier X from statically or semi-statically configured cell identifiers 808, which may be denoted by the set:

$$\{x(0), x(1), \ldots x(N-1)\}, \text{ for } N>1.$$

The values of x(n), where 0≤n<N may be configured by UE-specific RRC signaling 810. The parameter X may be dynamically signaled through additional bits provided in DCI 828 or through the reuse of an existing parameter such as $n_{SCID}$. When the set $\{x(0), x(1), \ldots x(N-1)\}$, from which X is selected, has more than one member, then an index used to select a member may be obtained through dynamic signaling, including through direct signaling of index bits in DCI 828 or by generating an index based on one or more properties of the DCI 828.

An index n may be directly signaled to UE 802 for selecting, a value of X=x(n) from the set $\{x(0), \ldots, x(N-1)\}$, which may be populated using a plurality of semi-statically configured virtual cell identifiers 808. The index may be provided to the UE 802 using additional bits provided in a grant, or by reusing existing bits such as scrambling identity (SCID) bit. As described elsewhere herein, the index may be provided by direct signaling when DCI 828 has certain properties Additionally, or alternatively, the index or other indicator may be provided through dynamic signaling. Dynamic signaling may include modifying an attribute or property of a signal that is otherwise used for purposes unrelated to the selection of a cell identifier. In certain embodiments, one or more properties of DCI 828 transmitted by eNB 804 may be used to convey the index or otherwise indicate which of cell identifiers 808 should be selected by UE 802 for configuring an aspect of UE 802 operation. The one or more properties may relate to a type of DCI format 814, 816, or 818, a type of downlink control channel 820, 822 used to carry the DCI 828, and a type of sublime 824, 826 that carries the DCI 828.

An index may be generated using criteria that may include certain properties of the DCI 828, specifically assigned bits in the DCI 828, reused bits in the DCI 828, and other statically configured information. Some dynamically signaled information may narrow down a selection of virtual cell identifiers and other criteria may then be used to make a final selection.

Information signaled directly in DCI 828 and knowledge of a format type 814, 816, and 818 of the DCI 828 may be combined to indicate a cell identifier to the UE 802. DCI 828 may have different formats, including Type 1A 814, Type 2C 816, and Type 2D 818, among others, which define certain structures, fields and other attributes of the DCI 828. The examples of DCI format types (1A, 2C, and 2D) are selected to simplify illustration, and the principles described in relation thereto apply equally to other DCI format types, including format types defined by current and future wireless communication protocols. DCI format types 814, 816 and 818 may define or relate to certain capabilities of a UE 802 or eNB 804. Some DCI types 816 and 818 may carry one or more bits specifically assigned to serve as an index or identifier, and may thereby directly indicate a selection to the UE 802. Accordingly, UE 802 may determine that an index is provided in DCI payload 812 when DCI 828 has a certain format. If, for example, DCI 828 is transmitted with Type 2C or Type 2D format, then an index or other indicator may be coded in the DCI payload 812 to enable direct signaling of an index or other indicator to UE 802. However, if DCI 828 is transmitted with Type 1A format, directly signaled bits may not be available and other information related to the transmission may be needed to select a cell identifier 808.

When DCI 828 has a Type 1A format 814, the index used to select one of cell identifiers 808 may be set to a predetermined value. In some embodiments, a predefined cell identifier is used when DCI 828 has a Type 1A format 814.

In some embodiments, the UE 802 may determine an index or a predetermined cell identifier based on the type of downlink control channel 820, 822 and/or type of subframe 824, 826 that carries the DCI 828 when, for example, a received DCI 828 has a Type 1A format 814. For example, when the DCI 828 is carried in enhanced PDCCH (ePDCCH) 822, one or more bits may be directly embedded in the ePDCCH 822 to serve as an index for selecting between statically or semi-statically defined cell identifiers 808. In some embodiments, a scrambling identifier used for scrambling the ePDCCH 822 may serve as the cell identifier 808, or as an index to select one of statically or semi-statically defined cell identifiers 808.

When Type 1A formatted DCI 828 is carried in legacy PDCCH 820, then the UE 802 may select a predetermined cell identifier, which may be included in the statically or semi-statically defined cell identifiers 808. The predetermined cell identifier may be included in a predefined location in statically or semi-statically defined cell identifiers 808 and may be accessed using a predefined index value, such as an index n=0. In some embodiments, the predetermined cell identifier may be identified in the statically or semi-statically defined cell identifiers 808 using an index that is statically configured for the UE 802. In some embodiments, the predetermined cell identifier may be statically configured. In some embodiments, the predetermined cell identifier may be a physical cell identifier, such as the identifier of a serving cell identified by the UE 802.

In some embodiments, the UE 802 may determine an index or a predetermined cell identifier based on the type of subframe that carries DCI 828. For example, the index may be determined based in part upon whether the DCI 828 is received in an MBSFN subframe 824 or a non-MBSFN subframe 826. In particular, the type of subframe 824 or 826 used to carry DCI 828 may limit the information available for selecting a cell identifier at the UE 802. For example, when DCI 828 is carried in a non-MBSFN type 826 subframe, information may be available to UE 802 for selecting a virtual cell identifier only if DCI format Type 2C 816 or Type 2D 818 is used or if the DCI 828 is provided in ePDCCH 822. When DCI Type 1A format 814 is received in a PDCCH 820 of a non-MBSFN subframe 826, then the index may be set to a predetermined value or a predefined cell identifier may be used. The predefined cell identifier may be a physical cell identifier. In another example, when DCI type 1A format 814 is used to signal DCI 828 in a PDSCH transmission, the UE 802 may be informed of the virtual cell identifier using a combination of specially assigned bits and bits that are defined for other use (e.g. the SCID bit).

In non-MBSFN subframes 826, a CRS-based fallback transmission mode may be used. The use of a fallback transmission mode may require that the UE 802 be informed of a physical cell identifier to be used. This physical cell identifier may be tied to the serving cell for transmissions using legacy PDCCH 820. In some embodiments, the physical cell identifier is signaled separately.

In some embodiments, when non-MBSFN subframes 826 carry the DCI 828, a fallback mode may be used that employs DM-RS based demodulation. The signaling of virtual cell identifiers to be used for DM-RS scrambling may be similar to the signaling discussed in connection with DCI

828 carried in MBSFN 824 subframes. For example, port 7 may be used in this operation, similar to the existing transmission mode 9.

A determination of which fallback mode should be used during DM-RS based fallback transmission mode may be based, at least in part, on whether control is received through legacy PDCCH 820 or ePDCCH 822. For example, a DM-RS based fallback transmission mode may be used whenever control is received through the ePDCCH 822 and a CRS-based fallback transmission may be used when control is received on the legacy PDCCH 820.

In some embodiments, fallback operation may be based on a predetermined cell identifier, which may be a physical cell identifier. For example, an ePDCCH 822 configured for a UE 802 may rely entirely on one or more virtual cell identifiers 808, and the eNB 804 and the UE 802 may be out of synchronization when a reconfiguration of virtual cell identifiers is initiated for the UE 802. Potential ambiguity and misalignment can be alleviated by specifying cell identifiers for the UE 802 that include one or more virtual cell identifiers associated with certain control decoding candidates and one or more physical cell identifiers associated with other control decoding candidates.

In an MBSFN subframe 824, a predetermined virtual cell ID may be used when control is received through either of the PDCCH 820 or ePDCCH 822 for DCI Type 1A format 814. The predetermined virtual cell identifier may be indicated using an index known to the UE 802, for example, index n=0. When the DCI 828 is received on ePDCCH 822 in an MBSFN subframe 824, an ePDCCH scrambling identifier may be used. The ePDCCH scrambling identifier may be one of a plurality of identifiers available when the ePDCCH 822 supports different scrambling initializations. An index may be formed using an entire ePDCCH scrambling identifier or a subset of the bits in the ePDCCH scrambling identifier. In some embodiments, ePDCCH 822 carries bits based on DCI type 1A format that may be used to signal a virtual cell identifier in use for PDSCH.

Other properties of DCI 828 may be used by UE 802 to select a cell identifier. In some embodiments, the selection of a cell identifier may be based, at least in-part on the control channel in which DCI 828 is found during a search of a plurality of candidate control channels (CCEs). The search space may be partitioned into a set of CCEs and a virtual cell ID 808 may be selected, at least in part, based on the partition in which the DCI 828 is received.

As described herein, dynamic signaling may identify virtual cell identifiers and physical cell identifiers. In some embodiments, the partitioning of virtual cell identifier based control and physical cell identifier based control may depend on whether the UE 802 is configured to monitor ePDCCH 822 only, or monitor a combination of ePDCCH 822 and PDCCH 820. In the former case, some ePDCCH 822 decoding candidates may rely on one or more virtual cell identifiers 808, and some other ePDCCH decoding candidates may rely on a physical cell identifier. In the latter case, where UE 802 monitors both PDCCH 820 and ePDCCH 822, all ePDCCH 822 may rely on virtual cell identifiers 808, while at least some PDCCH 820 decoding candidates may rely on a physical cell identifier.

Partitioning of virtual cell identifier based control and physical cell identifier based control may also be subframe-dependent, aggregation-level dependent, search space dependent, with differentiation between common and UE-specific search spaces for example, DCI format dependent, etc. In one example, a physical cell identifier may be used for ePDCCH 822 based DCI format 1A 814 in some subset of subframes (e.g., subframes 0, 4, 5 and 9), while one or more virtual cell identifiers are used for ePDCCH 822 in all other cases.

Certain aspects of the invention may be applied to uplink signaling. In some embodiments, one or more of virtual cell identifiers 808 may be configured for the uplink. Dynamic signaling may be used to select which of the cell identifiers 808 should be used for a specific subframe. This dynamic signaling may take advantage of additional bits available in certain DCI formats 816 and 818, and may also be based specifically on the type of DCI format used (e.g., DCI format Type 0 vs. DCI format Type 4) or some combination of payload 812 and format of the DCI 828. In one example, DCI format Type 4 may provide one or more bits that are not available in DCI format Type 0. The additional bits in DCI format Type 4 may be used or assigned to determine the virtual cell identifier for use in uplink transmission, while a predetermined virtual cell identifier may be used when DCI format Type 0 is received.

In some embodiments, determination of a virtual cell identifier may be based, at least in part, on whether the DCI 828 is received through ePDCCH 822 or a PDCCH 820. For example, use of DCI format Type 0 may indicate to the UE 802 that a physical cell identifier should be used for fallback operation, while DCI format Type 4 may indicate that virtual cell identifier should be used. For retransmissions, the UE 802 may use the same virtual cell identifier that was used for the initial transmission.

Dynamic signaling may be used to select other parameters used for configuring a UE 802. Configuration information that may be semi-statically configured and selected using dynamic signaling may include locations in control or data region used for hybrid ARQ indicator channel (PHICH) information and virtual cell identifiers for transmission of channel state information (CSI) information carried in PUCCH.

Certain embodiments employ dynamic signaling and identifier selection for Hybrid ARQ indication. Legacy PHICH transmission may be accommodated in a corresponding legacy control region and an "enhanced PHICH" (ePHICH) may be supported as part of ePDCCH 822 and may be carried in the data region. A combination of parameters may be employed by the UE 802 to determine where HARQ indication corresponding to its uplink transmissions can be found. The parameters may include DCI format type, subframe type, PDCCH type, and search space partitioning. In one example, the UE 802 may look for the PHICH in the legacy control region when a grant associated with an uplink PUSCH transmission is received on the legacy PDCCH 820. If the grant is received on ePDCCH 822, the UE 802 may look for an ePHICH in the data region. In another example, the type of grant that triggered the uplink transmission may provide additional indication to the UE 802 as to where the Hybrid ARQ indication may be found.

Certain embodiments employ dynamic signaling and identifier selection for uplink PUCCH transmissions. In one example, for uplink transmission of HARQ ACK/NACK information, the UE 802 may take advantage of additional bits available in certain DCI formats and may also be based on the specific DCI format type 814, 816 or 818 used, as well as whether control is received through ePDCCH 822 or legacy PDCCH 820 to determine a virtual cell identifier. In some embodiments, the UE 802 may use the same virtual cell identifier for uplink ACK/NACK transmission that was used for downlink signaling. Other mappings may also be performed, and the mapping may depend upon a combination of parameters including DCI format type, downlink control channel type, subframe type, or by an explicit indication in DCI 828. When multiple types of uplink control information are multiplexed on PUCCH, a common virtual cell ID 808 may be selected for transmission according to a predetermined prioritization.

Certain embodiments employ dynamic signaling and identifier selection for feedback of CSI information. In one example, a virtual cell identifier may be configured for use in transmitting aperiodic feedback on PUSCH as part of the feedback configuration, and/or may be selected based on one or more parameters, including explicit bits provided in a DCI format requesting the aperiodic CSI report, DCI format type, and the type of control channel that delivers the grant requesting the aperiodic report. The type of control channel may be legacy PDCCH 820, or ePDCCH 822, for example.

A combination of semi-static and dynamic signaling may be employed to determine a virtual cell identifier 808 for transmitting the CSI feedback. The selected virtual cell identifier selected for transmission of periodic CSI feedback carried on PUCCH may be configured as part of the feedback configuration. In some embodiments, the virtual cell identifier selected for transmitting PUCCH multiplexed with other uplink control information may be based on other components of the multiplexed transmission or the multiplexed transmission itself.

In certain embodiments, cell identifiers 808 may comprise one or more physical cell identifiers in addition to one or more virtual cell identifiers, particularly for use during fallback operations and/or to avoid ambiguity whenever a reconfiguration of virtual cell identifiers is initiated. For example, a physical cell identifier may be used when a set of virtual cell identifiers used in conjunction with dynamic selection is configured through RRC 810.

In certain embodiments, one or more virtual cell identifiers used for uplink operation may each be replaced by an index for selecting a set of parameters that are used together in place of the virtual cell ID. The set of parameters may define one or more characteristics of a virtual cell. The set of parameters may individually define characteristics, attributes, parameters and/or behaviors that would otherwise be defined by the virtual cell. In particular, this set of parameters may include a value $N_{ID}^{BSI}$ which may substitute $N_{ID}^{CELL}$ for initiating a pseudo-random sequence generator, $D_{SS}^{BSI}$ which may substitute group number (u) and sequence index (v) generation formulas (including SH and SGH initialization), and $c_{init}^{CSH}$ which may serve as a substitute $c_{init}$ in the CSH initialization ($n_{PN}(n_S)$).

Table 1 below describes methods by which an index, a cell identifier or other information can be signaled to a UE 802 from an eNB 804 according to certain aspects of the invention.

TABLE 1

| Subframe type | DCI format type | Control received from PDCCH | Control received from ePDCCH |
|---|---|---|---|
| MBSFN | 2C/2D | Explicitly signaled | Explicitly signaled |
|  | 1A | use predetermined x(i) | 1: use a predetermined ID<br>2: use ePDCCH scrambling ID<br>3: Explicitly signaled in ePDCCH |
| non-MBSFN | 2C/2D | Explicitly signaled | Explicitly signaled |
|  | 1A | N/A (CRS-based TxD fallback | 1: use predetermined ID<br>2: use ePDCCH scrambling ID |

TABLE 1-continued

| Subframe type | DCI format type | Control received from PDCCH | Control received from ePDCCH |
|---|---|---|---|
|  |  | mode) | when DM-RS fallback mode 3: Explicitly signaled in ePDCCH |

Figure 9:
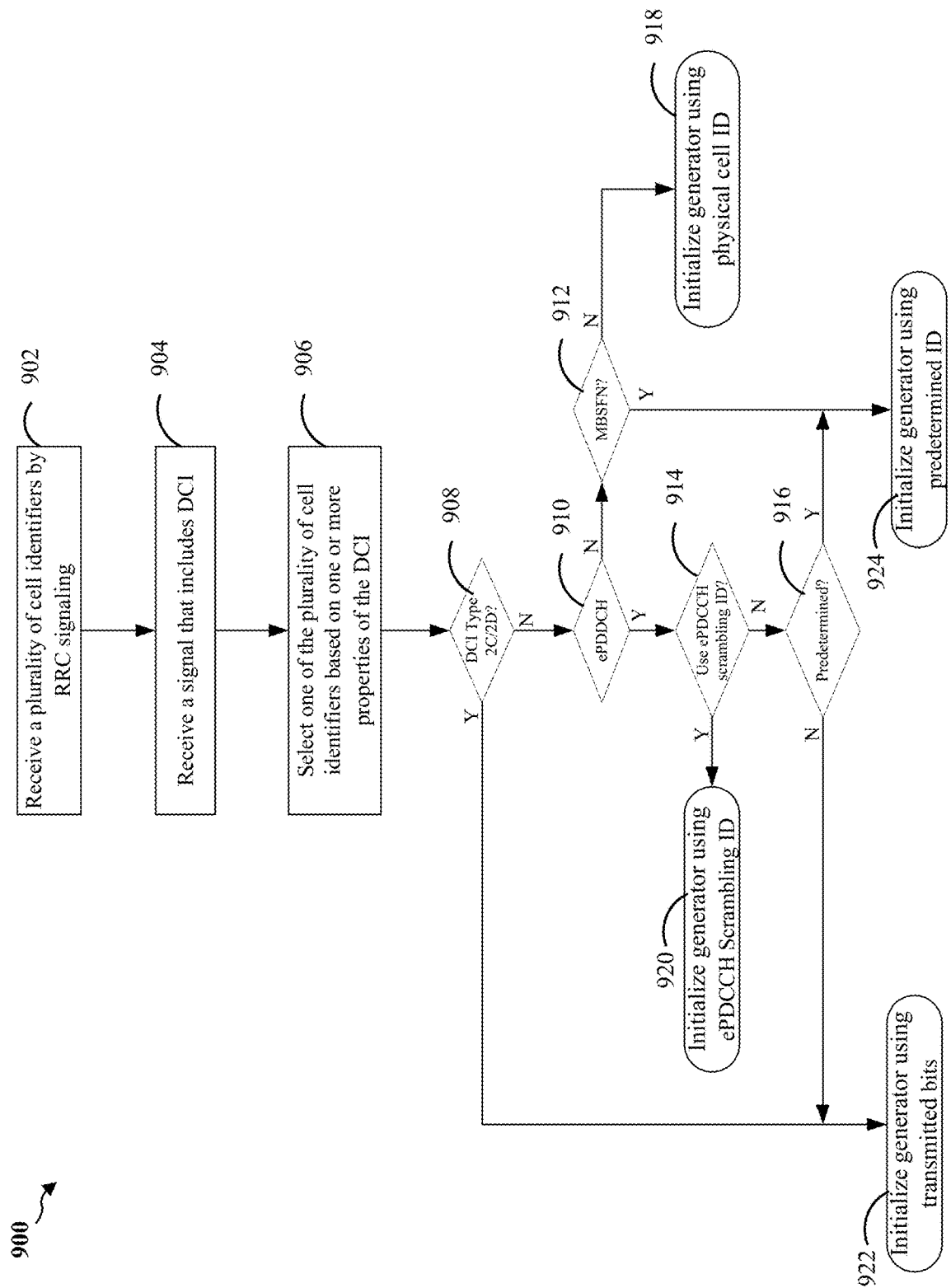
FIG. 9 is a flow chart of a method of wireless communication.

FIG. 9 is a flow chart 900 of a method of wireless communication. The method may be performed by a UE 802. At step 902, the UE 802 receives a plurality of cell identifiers through RRC signaling. In some embodiments, the UE 802 may receive other configuration information through the RRC 810 signaling.

At step 904, the UE 802 receives a signal including DCI 828. The DCI 828 may be received in an ePDCCH 822 or a PDCCH 820. In some embodiments, receiving a signal includes receiving the DCI 828 in a first set of candidate control channels (CCEs) of at least two sets of CCEs. The selected cell identifier may be selected, at least in part, based on the set of CCEs in which the DCI 828 is received.

At step 906, the UE 802 selects one of the plurality of cell identifiers based on one or more properties associated with the DCI. In some embodiments, the one or more properties are not exclusively associated with determining a cell identifier. The properties may include a control channel in which DCI 828 is delivered, a type of the DCI 828 and the subframe type that carries the DCI 828.

At step 908, if the DCI format type provides bits that carry an index or other indicator, then the UE 802 may select a cell identifier using the bits and the UE 802 initializes a pseudo-random sequence generator using the selected cell identifier at step 922.

If the DCI format type does not support direct signaling of an index or other indicator, then at step 910, the UE 802 determines whether the DCI 828 is carried in an ePDCCH 822. If the DCI 828 is carried in a PDCCH 820, then the UE 802 may determine a cell identifier based on whether at step 912 it is determined that the DCI is carried in an MBSFN subframe 824. If an MBSFN subframe 824 is the type of subframe used, then the UE 802 may use a predetermined cell identifier to initialize a pseudo-random sequence generator at step 924. Otherwise, the UE 802 may initialize the pseudo-random generator using a physical cell identifier at step 918.

At step 914, it is determined whether the ePDCCH 822 is scrambled with an ePDCCH scrambling identifier and, if so, it is determined if the UE 802 should use the ePDCCH scrambling identifier to initialize a pseudo-random sequence generator at step 920. If it is determined that the UE 802 should not use the ePDCCH scrambling identifier as a virtual cell identifier or for initializing the pseudo-random generator, the at step 916, the UE 802 determines whether the generator should be initialized using bits transmitted in the ePDCCH at step 922, or using a predetermined identifier at step 924.

In some embodiments, the DCI 828 includes an uplink grant. The selected cell identifier may be used for an uplink transmission corresponding to the uplink grant.

In some embodiments, channel state information (CSI) may be provided based on the selected cell identifier.

Figure 10:
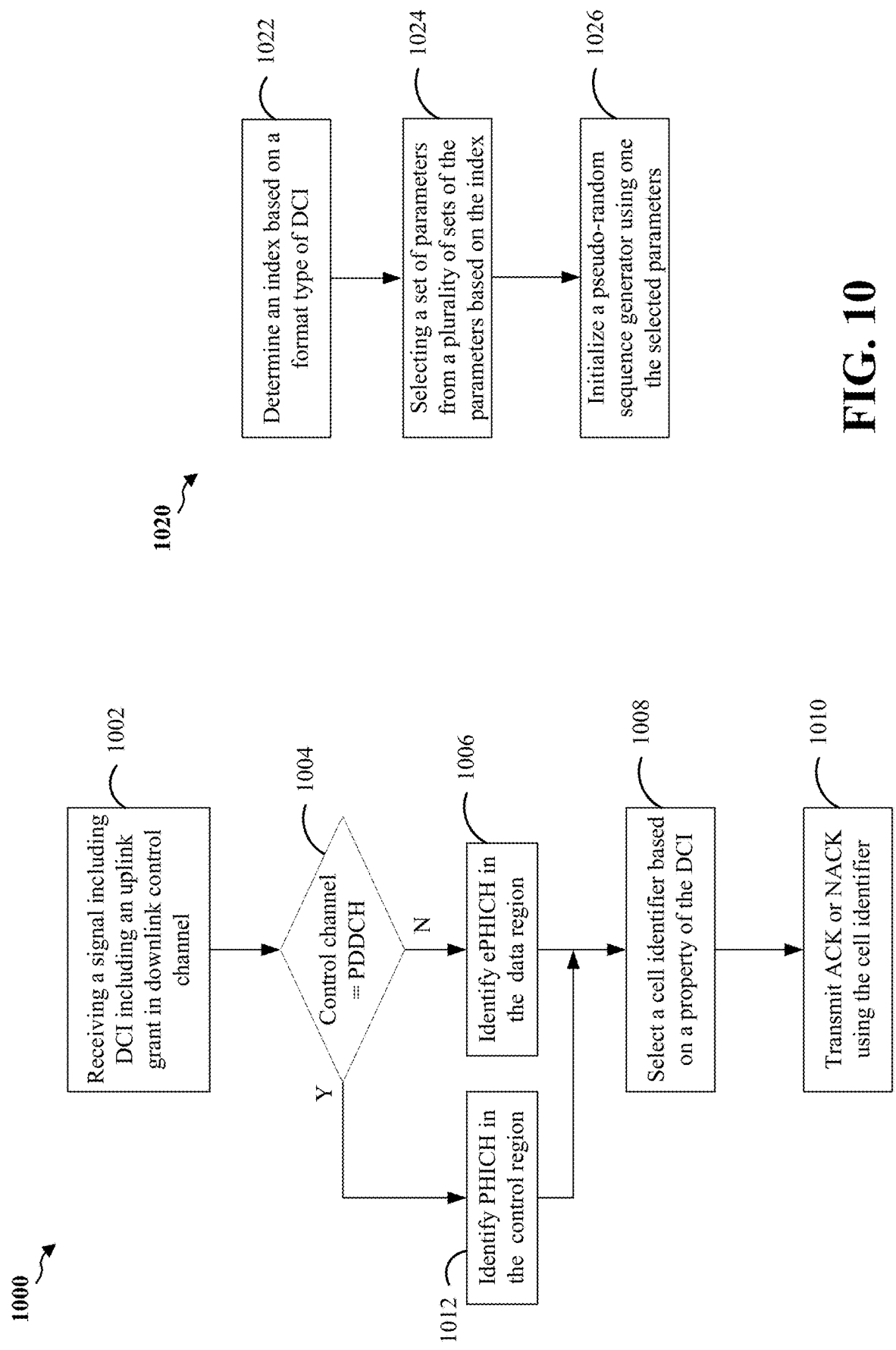
FIG. 10 is a flow chart of a method of wireless communication.

FIG. 10 includes a flow chart 1000 of a method of wireless communication. The method may be performed by a UE 802. At step 1002, the UE 802 receives a signal including DCI that includes an uplink grant. The DCI may be received in one of a PDCCH or an ePDCCH. At step 1004, the UE 802 determines if the control channel providing the grant is a PDCCH and, if so, may identify PHICH in a control region at step 1012. If at step 1004, the UE determines the control channel to be ePDCCH, the UE may identify an ePHICH in a data region at step 1006.

At step 1008, the UE 802 selects one of a plurality of cell identifiers based on a property associated with the DCI. The property may not be exclusively related to determining a cell identifier.

At step 1010, the UE 802 provides an acknowledgement or a negative acknowledgement based on the selected cell identifier.

FIG. 10 includes a flow chart 1020 of a method of wireless communication. The method may be performed by a UE 802. At step 1022, the UE 802 determines an index based on a format type of DCI. At step 1024, the UE selects a set of parameters from a plurality of sets of the parameters based on the index. The set of parameters may define one or more characteristics of a virtual cell. The plurality of sets of the parameters is configured through RRC signaling.

At step 1026, the UE 802 initializes a pseudo-random sequence generator using one parameter of the selected set of parameters. The set of parameters may be used to define characteristics of an uplink communication channel.

Figure 11:
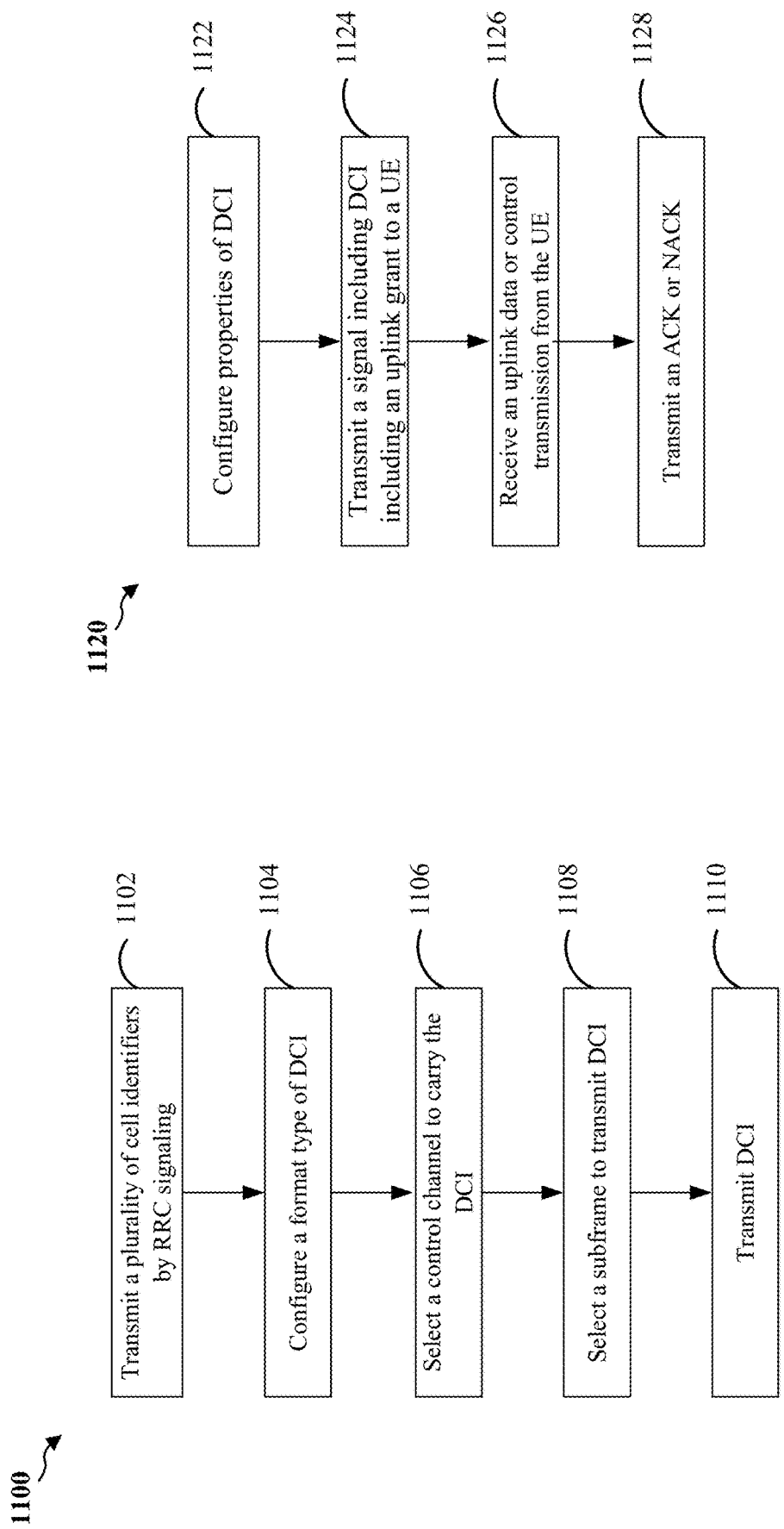
FIG. 11 is a flow chart of a method of wireless communication.

FIG. 11 includes a flow chart 1100 of a method of wireless communication. The method may be performed by an eNB 804. At step 1102, eNB 804 provides a plurality of identifiers in radio resource control (RRC) signaling to the UE 802. The indicated cell identifier may be one of the plurality of identifiers 808.

The eNB 804 configures one or more properties of DCI. A UE 802 may be adapted to determine a cell identifier indicated by the configured properties. However, the configured properties may not be exclusively associated with determining the cell identifier. The UE 802 may be adapted to use the indicated cell identifier to initialize a pseudo-random sequence generator. At step 1104, eNB 804, configures a format type of the DCI. At step 1106, eNB 804 selects a control channel to carry the DCI. The DCI may be transmitted in an ePDCCH that is scrambled with an ePDCCH scrambling identifier and the indicated cell identifier may be the ePDCCH scrambling identifier when the DCI has a type 1A format.

At step 1108, the eNB 804 selects a subframe type for the DCI. The DCI may be provided in an MBSFN subframe or a non-MBSFN subframe. The cell identifier may be indicated based on the subframe type. The DCC may include an uplink grant, and the indicated cell identifier may be used for an uplink transmission corresponding to the uplink grant. The selected cell identifier may be used to provide CSI.

At step 1110, the eNB 804 transmits a signal including the DCI to the UE 802.

FIG. 11 includes a flow chart 1120 of a method of wireless communication. The method may be performed by an eNB 804. At step 1122, eNB 804 configures one or more properties of the DCI. The UE 802 may be adapted to determine a location in which PHICH is transmitted by the eNB 804, based on the configured properties.

At step 1124, eNB 804 transmits a signal including DCI that includes an uplink grant to a UE 802. The DCI may be transmitted in one of a PDCCH or an ePDCCH.

At step 1126, eNB 804 receives an uplink data or control transmission from the UE, in accordance with the uplink grant.

At step 1128, eNB 804 sends an ACK or a NACK in a PHICH in a control region or in an ePHICH in a data region based on whether the grant was provided in the PDCCH or in the ePDCCH.

Figure 12:
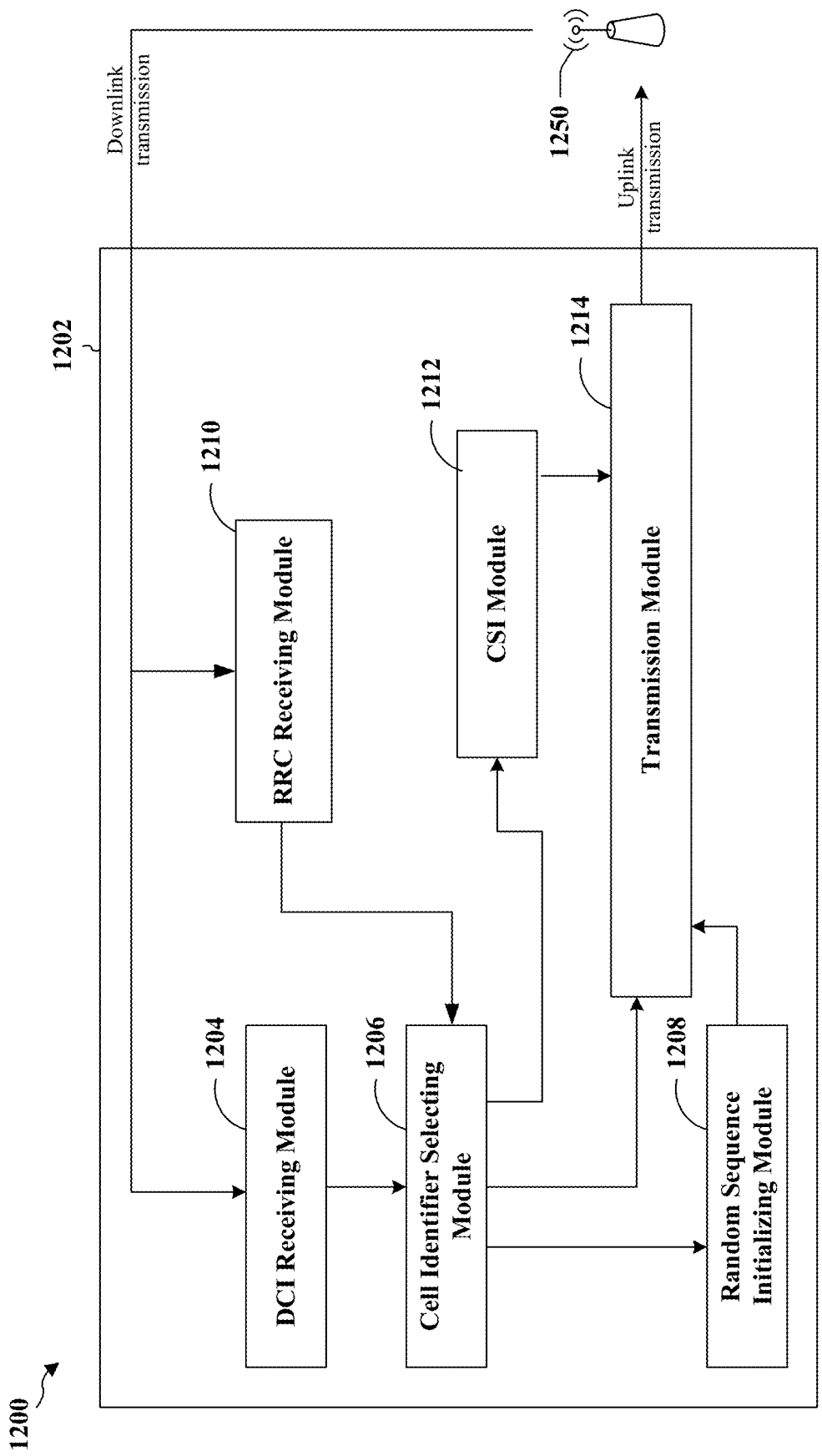
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a UE. The apparatus 1202 includes a module 1204 that receives DCI, a module 1206 that selects a cell identifier, a module 1208 that initializes a random sequence generator, a module 1210 that receives RRC, a module 1212 that provides CSI feedback and a module 1214 that transmits to an eNB 804 using transceiver 1250.

The apparatus may include additional modules that perform each of the steps of the algorithm in the aforementioned flow charts FIGS. 9 and 10. As such, each step in the aforementioned flow charts FIGS. 9 and 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
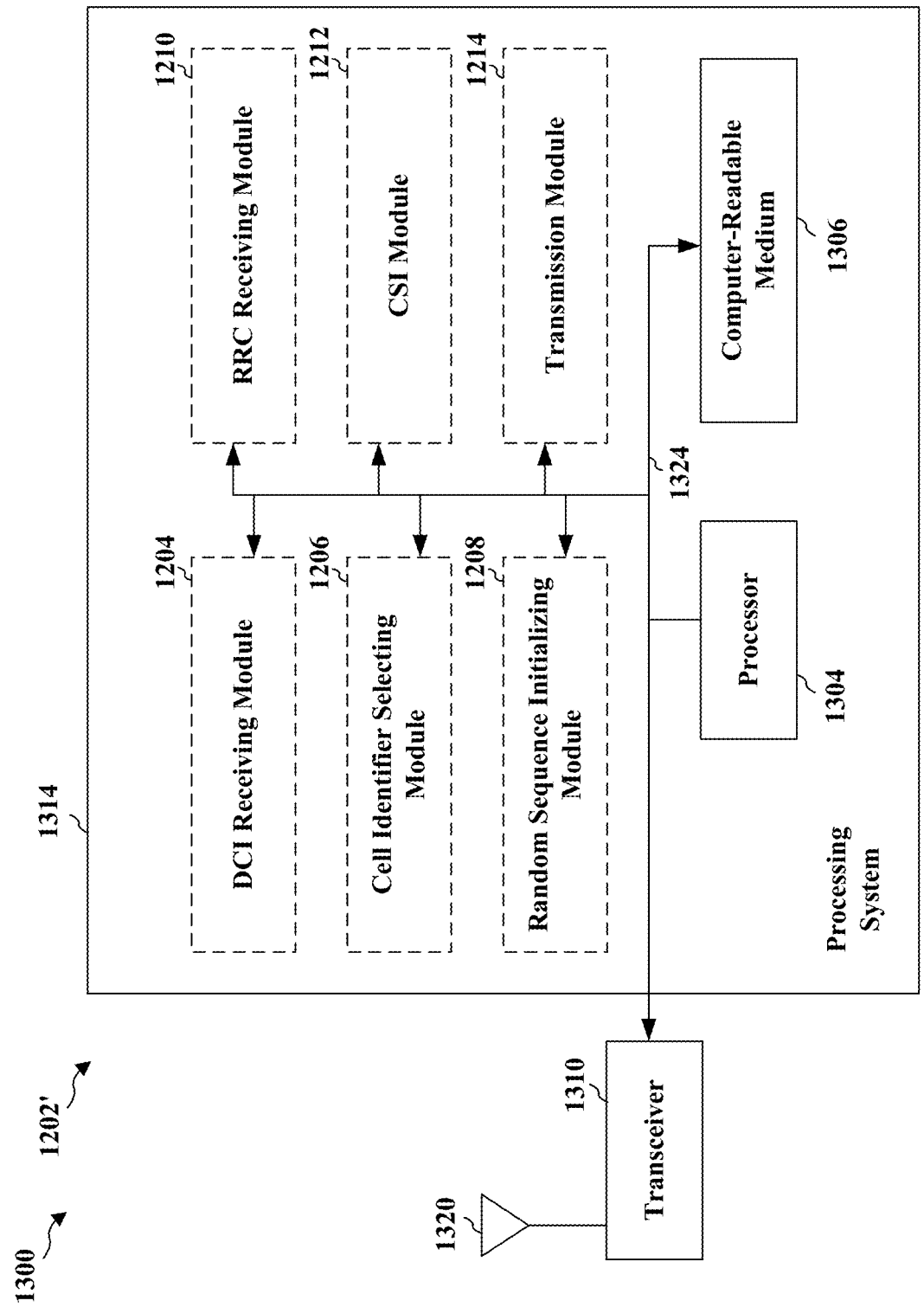
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, 1212, and 1214, and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes at least one of the modules 1204, 1206, 1208, 1210, 1212, and 1214. The modules may be software modules running in the processor 1304, resident/stored in the computer readable medium 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 1202/1202' for wireless communication includes means 1204 for receiving a signal including DCI, means 1206 for selecting one of a plurality of cell identifiers based on one or more properties associated with the DCI, means 1208 for initializing a pseudo-random sequence generator based on the selected cell identifier, means 1210 for receiving the plurality of cell identifiers via RRC signaling, means 1212 for providing CSI based on the selected cell identifier, and means 1214 for transmitting information to the eNB 804.

In some embodiments, the one or more properties are not exclusively associated with determining a cell identifier. In some embodiments, the DCI is received in ePDCCH. The ePDCCH may be scrambled with an ePDCCH scrambling identifier. In some embodiments, means 1206 determines a type of format of the DCI, and selects the selected cell identifier based on the ePDCCH scrambling identifier when the DCI has a type 1A format. In some embodiments, means 1206 determines a type of format of the DCI and selects a predetermined cell identifier when the DCI has a type 1A format. In some embodiments, means 1206 determines a subframe type in which the DCI is received, and further determines whether the subframe is a MBSFN subframe or a non-MBSFN subframe. The cell identifier may be selected, at least in part, based on the subframe type.

In some embodiments, means 1204 receives the DCI in a first set of candidate control channels (CCEs) of at least two sets of CCEs, and the selected cell identifier may be selected, at least in part, based on the set of CCEs in which the DCI is received. The DCI may include an uplink grant. In some embodiments, the selected cell identifier is used for an uplink transmission corresponding to the uplink grant.

The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 14:
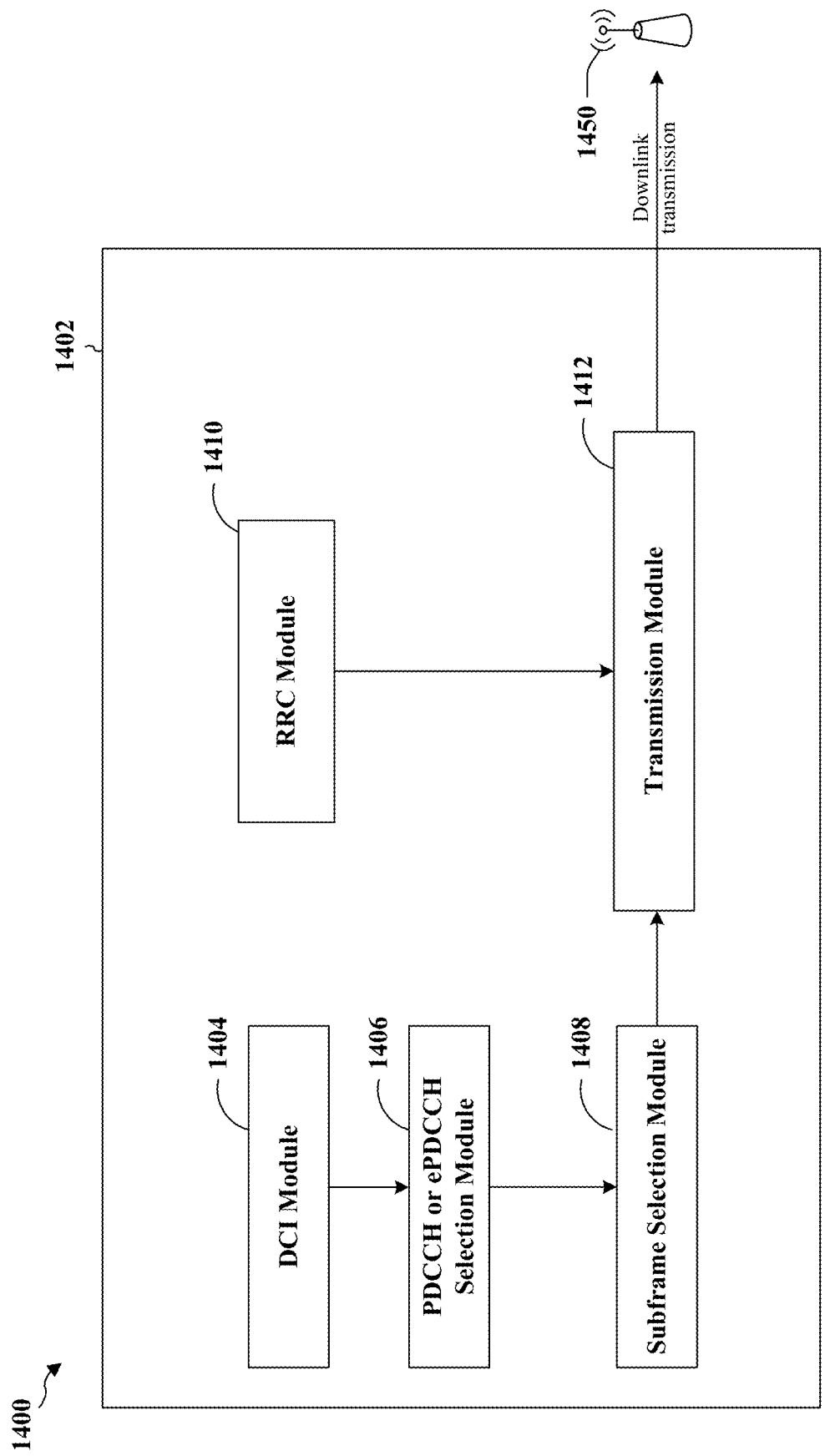
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be an eNB 804. The apparatus includes a module 1404 that configures DCI 828, a module 1406 that selects one of a PDCCH 820 or ePDCCH 822 to carry the DCI 828, a module 1408 that selects between an MBSFN subframe 824 and a non-MBSFN subframe 826 for transmitting the DCI 828, a module 1410 for providing statically or semi-statically configured parameters in RRC 810, and a transmission module 1412 that transmits DCC 828 and RRC 810 to UE 802 through transceiver 1450.

The apparatus may include additional modules that perform each of the steps of the algorithm in the aforementioned flow charts of FIG. 11. As such, each step in the aforementioned flow charts of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
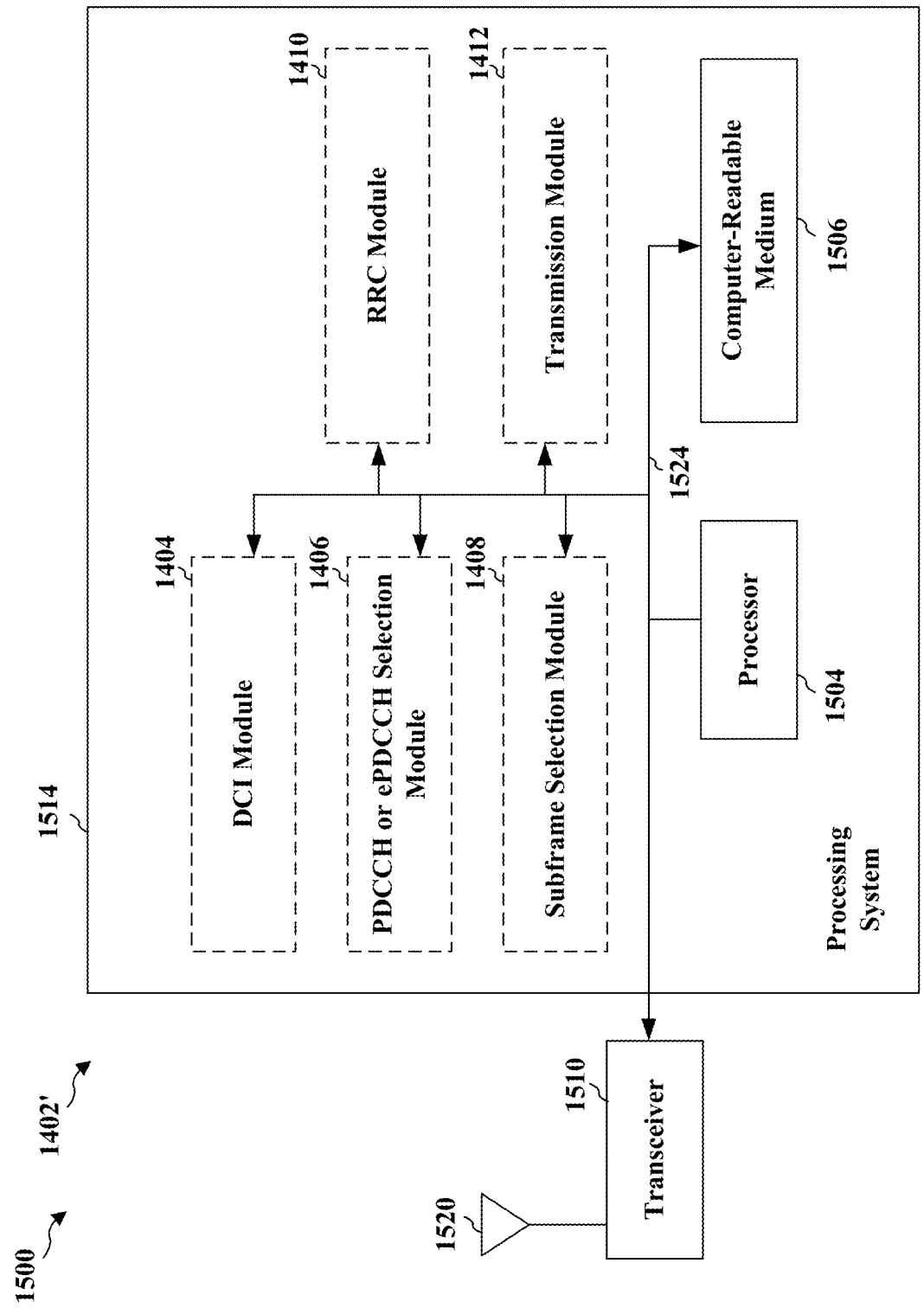
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, 1410, 1412, and the computer-readable medium 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described supra for any particular apparatus. The computer-readable medium 1506 may also be used for storing data that is manipulated by the processor 1504 when executing software. The processing system further includes at least one of the modules 1404, 1406, 1408, 1410, and 1412. The modules may be software modules running in the processor 1504, resident/stored in the computer readable medium 1506, one or more hardware modules coupled to the processor 1504, or some combination thereof. The processing system 1514 may be a component of the eNB 610 and may include the memory 676 and/or at least one of the TX processor 616, the RX processor 670, and the controller/processor 675.

In one configuration, the apparatus 1402/1402' for wireless communication includes means 1404 for configuring one or more properties of DCI 828. UE 802 may be adapted to determine a cell identifier indicated by the configured properties. The configured properties may not be exclusively associated with determining the cell identifier. Means 1404 may configure a format type of the DCI 828. Means 1404 may select a control channel for transmitting the DCI 828, whereby the cell identifier is indicated, at least in part, by the control channel selection The apparatus 1402/1402' for wireless communication may include means 1412 for transmitting a signal including the DCI 828 to the UE 802.

The apparatus 1402/1402' for wireless communication may include means 1410 for providing a plurality of identifiers 808 in RRC 810 signaling to the UE 802, whereby the indicated cell identifier is one of the plurality of identifiers 808. The UE 802 may be adapted to use the indicated cell identifier to initialize a pseudo-random sequence generator.

The apparatus 1402/1402' for wireless communication may include means 1406 for transmitting the DCI 828 in an ePDCCH 822 that is scrambled with an ePDCCH scrambling identifier. The indicated cell identifier may be equal to the ePDCCH scrambling identifier when the DCI 828 has a type 1A format 814, for example. In some embodiments, the indicated cell identifier is a predetermined cell identifier when the DCI 828 has a type 1A format 814.

The apparatus 1402/1402' for wireless communication may include means 1408 for transmitting the DCI 828 in one of a MBSFN subframe 824 and a non-MBSFN subframe 826. The cell identifier may be indicated based on the subframe type 824 or 826.

In some embodiments, the DCI 828 includes an uplink grant, and the indicated cell identifier may be used for an uplink transmission corresponding to the uplink grant. In some embodiments, the selected cell identifier is to be used to provide CSI. In certain embodiments, means 1412 transmits an ACK or a NACK in a PHICH in a control region when the grant is provided in the PDCCH 820, and transmits the ACK or the NACK in an enhanced PHICH in a data region when the grant is provided in the ePDCCH 822.

The aforementioned means may be one or more of the aforementioned modules of the apparatus 1402 and/or the processing system 1514 of the apparatus 402' configured to perform the functions recited by the aforementioned means. As described supra, the processing system 1514 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications, comprising:
 receiving, by a user equipment (UE), a signal including downlink control information (DCI); and
 selecting, by the UE, one of a plurality of cell identifiers, which identify a plurality of cells, based on one or more properties associated with the DCI, wherein the one or more properties include at least one of information included in the DCI or information associated with communication of the DCI and are not exclusively associated with determining a cell identifier, wherein the one of the plurality of cell identifiers is selected based on at least two of a type of format of the DCI, a subframe type in which the DCI is received, or a set of candidate control channels (CCEs) in which the DCI is received; and
 wherein the selecting the one of a plurality of cell identifiers includes determining the type of format of the DCI and selecting the selected cell identifier based on an enhanced physical downlink control channel (PDCCH) scrambling identifier.

2. The method of claim 1, further comprising initializing a pseudo-random sequence generator based on the selected cell identifier.

3. The method of claim 1, further comprising receiving the plurality of cell identifiers via radio resource control (RRC) signaling.

4. The method of claim 1, wherein the DCI has a type 1A format.

5. The method of claim 1, wherein the receiving the signal includes receiving the DCI in a first set of CCEs of at least two sets of CCEs.

6. The method of claim 1, wherein the DCI includes an uplink grant, and wherein the selected cell identifier is used for an uplink transmission corresponding to the uplink grant.

7. The method of claim 1, further comprising providing channel state information (CSI) based on the selected cell identifier.

8. An apparatus for wireless communication, the apparatus being a user equipment (UE), comprising:
 means for receiving a signal including downlink control information (DCI); and
 means for selecting one of a plurality of cell identifiers, which identify a plurality of cells, based on one or more properties associated with the DCI, wherein the one or more properties include at least one of information included in the DCI or information associated with communication of the DCI and are not exclusively associated with determining a cell identifier, wherein the means for selecting is configured to select the one of the plurality of cell identifiers based on at least two of a type of format of the DCI, a subframe type in which the DCI is received, or a set of candidate control channels (CCEs) in which the DCI is received; and
 wherein the means for selecting is configured to determine the type of format of the DCI and select the selected cell identifier based on an enhanced physical downlink control channel (PDCCH) scrambling identifier.

9. The apparatus of claim 8, further comprising means for initializing a pseudo-random sequence generator based on the selected cell identifier.

10. The apparatus of claim 8, further comprising means for receiving the plurality of cell identifiers via radio resource control (RRC) signaling.

11. The apparatus of claim 8, wherein the DCI has a type 1A format.

12. The apparatus of claim 8, wherein the means for receiving the signal is configured to receive the DCI in a first set of CCEs of at least two sets of CCEs.

13. The apparatus of claim 8, wherein the DCI includes an uplink grant, and wherein the selected cell identifier is used for an uplink transmission corresponding to the uplink grant.

14. An apparatus for wireless communication, the apparatus being a user equipment (UE), comprising:
 a memory; and
 at least one processor coupled to the memory and configured to:
  receive a signal including downlink control information (DCI); and select one of a plurality of cell identifiers, which identify a plurality of cells, based on one or more properties associated with the DCI, wherein the one or more properties include at least one of information included in the DCI or information associated with communication of the DCI and are not exclusively associated with determining a cell identifier, wherein the at least on processor configured to select the one of the plurality of cell identifiers based on at least two of a type of format of the DCI, a subframe type in which the DCI is received, or a set of candidate control channels (CCEs) in which the DCI is received; and wherein the at least one processor is further configured to determine the type of format of the DCI and select the selected cell identifier based on an enhanced physical downlink control channel (PDCCH) scrambling identifier.

15. A non-transitory computer-readable medium storing computer executable code for wireless communication, comprising code for:

receiving, by a user equipment (UE), a signal including downlink control information (DCI); and selecting, by the UE, one of a plurality of cell identifiers, which identify a plurality of cells, based on one or more properties associated with the DCI, wherein the one or more properties include at least one of information included in the DCI or information associated with communication of the DCI and are not exclusively associated with determining a cell identifier, wherein the one of the plurality of cell identifiers is selected based on at least two of a type of format of the DCI, a subframe type in which the DCI is received, or a set of candidate control channels (CCEs) in which the DCI is received; and wherein the selecting the one of a plurality of cell identifiers includes determining the type of format of the DCI and selecting the selected cell identifier based on an enhanced physical downlink control channel (PDCCH) scrambling identifier.

16. A method of wireless communications, comprising:
receiving a signal including downlink control information (DCI) including an uplink grant, wherein the DCI is received in one of a legacy physical downlink control channel (PDCCH) or an enhanced PDCCH;
determining a location of a Hybrid Automatic Repeat Request (HARQ) indicator based on the uplink grant; and
selecting one of a plurality of cell identifiers based on the DCI;
wherein the determining includes:
determining whether the grant is provided in the legacy PDCCH or in the enhanced PDCCH;
determining the location of the HARQ indicator based on at least two of a DCI format type, subframe type, PDCCH type, and search space partitioning; and
identifying the HARQ indicator in an enhanced physical HARQ indicator channel (PHICH) located in a data region when the grant is provided in the enhanced PDCCH.

17. The method of claim 16, further comprising identifying the HARQ indicator in a PHICH located in a control region when the grant is provided in the legacy PDCCH.

18. An apparatus for wireless communication, comprising:
means for receiving a signal including downlink control information (DCI) including an uplink grant, wherein the DCI is received in one of a legacy physical downlink control channel (PDCCH) or an enhanced PDCCH;
means for determining a location of a Hybrid Automatic Repeat Request (HARQ) indicator based on the uplink grant, wherein the means for determining is configured to:
determine whether the grant is provided in the legacy PDCCH or in the enhanced PDCCH;
determine the location of the HARQ indicator based on at least two of a DCI format type, subframe type, PDCCH type, and search space partitioning; and
identify the HARQ indicator in an enhanced physical HARQ indicator channel (PHICH) located in a data region when the grant is provided in the enhanced PDCCH;
means for selecting one of a plurality of cell identifiers based on the DCI.

19. The apparatus of claim 18, wherein the means for determining is further configured to identify the HARQ indicator in a PHICH located in a control region when the grant is provided in the legacy PDCCH.

20. An apparatus for wireless communication, comprising:
a memory; and
at least one processor coupled to the memory and configured to:
receive a signal including downlink control information (DCI) including an uplink grant, wherein the DCI is received in one of a legacy physical downlink control channel (PDCCH) or an enhanced PDCCH;
determine a location of a Hybrid Automatic Repeat Request (HARQ) indicator based on the uplink grant; and
select one of a plurality of cell identifiers based on the DCI;
wherein the at least one processor configured to determine the location is configured to:
determine whether the grant is provided in the legacy PDCCH or in the enhanced PDCCH;
determine the location of the HARQ indicator based on at least two of a DCI format type, subframe type, PDCCH type, and search space partitioning; and
identify the HARQ indicator located in an enhanced physical HARQ indicator channel (PHICH) in a data region when the grant is provided in the enhanced PDCCH.

21. The apparatus of claim 20, wherein the at least one processor configured to determine the location is further configured to identify the HARQ indicator in a PHICH located in a control region when the grant is provided in the legacy PDCCH.

22. A non-transitory computer-readable medium storing computer executable code for wireless communication, comprising code to:
receive a signal including downlink control information (DCI) including an uplink grant, wherein the DCI is received in one of a legacy physical downlink control channel (PDCCH) or an enhanced PDCCH;
determine a location of a Hybrid Automatic Repeat Request (HARQ) indicator based on the uplink grant; and
select one of a plurality of cell identifiers based on the DCI;
wherein the code to determine the location comprises code to:

determine whether the grant is provided in the legacy PDCCH or in the enhanced PDCCH;
determine the location of the HARQ indicator based on at least two of a DCI format type, subframe type, PDCCH type, and search space partitioning; and
identify the HARQ indicator in an enhanced physical HARQ indicator channel (PHICH) located in a data region when the grant is provided in the enhanced PDCCH.

23. The non-transitory computer-readable medium of claim 22, wherein the code to determine the location further comprises code to identify the HARQ indicator in a PHICH located in a control region when the grant is provided in the legacy PDCCH.

24. A method of wireless communications, comprising:
configuring one or more properties of downlink control information (DCI), wherein a user equipment (UE) is adapted to determine a cell identifier from a plurality of cell identifiers, which identify a plurality of cells, based on the configured one or more properties, and wherein the configured one or more properties include at least one of information included in the DCI or information associated with communication of the DCI and are not exclusively associated with determining a cell identifier, wherein the cell identifier of the plurality of cell identifiers is signaled based on at least two of a type of format of the DCI, a subframe type in which the DCI is transmitted, or a set of candidate control channels (CCEs) in which the DCI is transmitted; transmitting the DCI in an enhanced physical downlink control channel (PDCCH) that is scrambled with an enhanced PDCCH scrambling identifier, wherein the cell identifier is the enhanced PDCCH scrambling identifier; and
transmitting a signal including the DCI to the UE.

25. The method of claim 24, further comprising providing the plurality of cell identifiers in radio resource control (RRC) signaling to the UE.

26. The method of claim 25, wherein the UE is adapted to use the cell identifier to initialize a pseudo-random sequence generator.

27. The method of claim 24, wherein the DCI has a type 1A format.

28. The method of claim 24, wherein the configuring the one or more properties of the DCI includes selecting a control channel for transmitting the DCI, wherein the cell identifier is determined, at least in part, by the control channel selection.

29. The method of claim 24, wherein the DCI includes an uplink grant, and wherein the cell identifier is to be used for an uplink transmission corresponding to the uplink grant.

30. The method of claim 24, wherein the cell identifier is to be used to provide channel state information (CSI).

31. An apparatus for wireless communication, comprising:
means for configuring one or more properties of downlink control information (DCI), wherein a user equipment (UE) is adapted to determine a cell identifier from a plurality of cell identifiers, which identify a plurality of cells, based on the configured one or more properties, and wherein the configured one or more properties include at least one of information included in the DCI or information associated with communication of the DCI and are not exclusively associated with determining a cell identifier, wherein the cell identifier of the plurality of cell identifiers is signaled based on at least two of a type of format of the DCI, a subframe type in which the DCI is transmitted, or a set of candidate control channels (CCEs) in which the DCI is transmitted;
means for transmitting the DCI in an enhanced physical download control channel (PDCCH) that is scrambled with an enhanced PDCCH scrambling identifier, wherein the cell identifier is the enhanced PDCCH scrambling identifier;
wherein the means for transmitting is further configured to transmit a signal including the DCI to the UE.

32. The apparatus of claim 31, further comprising means for providing the plurality of cell identifiers in radio resource control (RRC) signaling to the UE.

33. The apparatus of claim 32, wherein the UE is adapted to use the cell identifier to initialize a pseudo-random sequence generator.

34. The apparatus of claim 31, wherein the DCI has a type 1A format.

35. The apparatus of claim 31, wherein the means for configuring the one or more properties of the DCI is configured to select a control channel for transmitting the DCI, wherein the cell identifier is determined, at least in part, by the control channel selection.

36. The apparatus of claim 31, wherein the DCI includes an uplink grant, and wherein the determined cell identifier is to be used for an uplink transmission corresponding to the uplink grant.

37. The apparatus of claim 31, wherein the cell identifier is to be used to provide channel state information (CSI).

38. An apparatus for wireless communication, comprising:
a memory; and
at least one processor coupled to the memory and configured to:
configure one or more properties of downlink control information (DCI), wherein a user equipment (UE) is adapted to determine a cell identifier from a plurality of cell identifiers, which identify a plurality of cells, based on the configured one or more properties, and wherein the configured one or more properties include at least one of information included in the DCI or information associated with communication of the DCI and are not exclusively associated with determining a cell identifier, wherein the cell identifier of the plurality of cell identifiers is signaled based on at least two of a type of format of the DCI, a subframe type in which the DCI is transmitted, or a set of candidate control channels (CCEs) in which the DCI is transmitted; transmitting the DCI in an enhanced physical downlink control channel (PDCCH) that is scrambled with an enhanced PDCCH scrambling identifier, wherein the cell identifier is the enhanced PDCCH scrambling identifier; and
transmit a signal including the DCI to the UE.

39. A non-transitory computer-readable medium storing computer executable code for wireless communication, comprising code for:
configuring one or more properties of downlink control information (DCI), wherein a user equipment (UE) is adapted to determine a cell identifier from a plurality of cell identifiers, which identify a plurality of cells, based on the configured one or more properties, and wherein the configured one or more properties include at least one of information included in the DCI or information associated with communication of the DCI and are not exclusively associated with determining a cell identifier, wherein the cell identifier of the plurality of cell identifiers is signaled based on at least two of a type of format of the DCI, a subframe type in which the DCI is transmitted, or a set of candidate control channels (CCEs) in which the DCI is transmitted; transmitting the DCI in an enhanced physical downlink control channel (PDCCH) that is scrambled with an enhanced PDCCH scrambling identifier, wherein the cell identifier is the enhanced PDCCH scrambling identifier; and transmitting a signal including the DCI to the UE.

40. A method of wireless communications, comprising: transmitting a signal including downlink control information (DCI) that includes an uplink grant to a user equipment (UE), wherein the DCI is transmitted in one of a legacy physical downlink control channel (PDCCH) or an enhanced PDCCH; and transmitting an acknowledgement (ACK) or a negative acknowledgement (NACK), wherein the transmitting of the ACK or the NACK comprises:
determining whether the grant is provided in the legacy PDCCH or in the enhanced PDCCH;
determining the DCI format type and whether additional bits are available in the DCI format; and
transmitting the ACK or the NACK in an enhanced physical Hybrid Automatic Repeat Request (HARD) indicator channel (PHICH).

41. The method of claim 40, further comprising configuring one or more properties of the DCI, wherein the UE is adapted to determine a cell identifier indicated by the configured properties, and wherein the configured properties are not exclusively associated with determining the cell identifier.

42. The method of claim 40, further comprising transmitting the ACK or the NACK in a PHICH located in a control region when the grant is provided in the legacy PDCCH based on the DCI format type and the additional bits available in the DCI format.

43. An apparatus for wireless communication, comprising:
means for transmitting a signal including downlink control information (DCI) that includes an uplink grant to a user equipment (UE), wherein the DCI is transmitted in one of a legacy physical downlink control channel (PDCCH) or an enhanced PDCCH; and
means for transmitting an acknowledgement (ACK) or a negative acknowledgement (NACK), wherein the means for transmitting the ACK or the NACK is configured to:
determine whether the grant is provided in the legacy PDCCH or in the enhanced PDCCH;
determine the DCI format type and whether additional bits are available in the DCI format; and
transmit the ACK or the NACK in an enhanced physical Hybrid Automatic Repeat Request (HARD) indicator channel (PHICH).

44. The apparatus of claim 43, further comprising means for configuring one or more properties of the DCI, wherein the UE is adapted to determine whether the PHICH is transmitted in the control region or in the data region based on the configured properties.

45. The apparatus of claim 43, wherein the means for transmitting the ACK or the NACK is further configured to transmit the ACK or the NACK in a PHICH located in a control region when the grant is provided in the legacy PDCCH based on the DCI format type and the additional bits available in the DCI format.

46. An apparatus for wireless communication, comprising:
a memory; and
at least one processor coupled to the memory and configured to:
transmit a signal including downlink control information (DCI) that includes an uplink grant to a user equipment (UE), wherein the DCI is transmitted in one of a legacy physical downlink control channel (PDCCH) or an enhanced PDCCH; and
transmit an acknowledgement (ACK) or a negative acknowledgement (NACK), wherein the at least one processor configured to transmit the ACK or the NACK is configured to:
determine whether the grant is provided in the legacy PDCCH or in the enhanced PDCCH;
determine the DCI format type and whether additional bits are available in the DCI format; and
transmit the ACK or the NACK in an enhanced physical Hybrid Automatic Repeat Request (HARQ) indicator channel (PHICH).

47. The apparatus of claim 46, wherein the at least one processor is further configured to transmit the ACK or the NACK in a PHICH located in a control region when the grant is provided in the legacy PDCCH based on the DCI format type and the additional bits available in the DCI format.

48. A non-transitory computer-readable medium storing computer executable code for wireless communication, comprising code to:
transmit a signal including downlink control information (DCI) that includes an uplink grant to a user equipment (UE), wherein the DCI is transmitted in one of a legacy physical downlink control channel (PDCCH) or an enhanced PDCCH; and
transmit an acknowledgement (ACK) or a negative acknowledgement (NACK), the code to transmit the ACK or the NACK comprises code to:
determine whether the grant is provided in the legacy PDCCH or in the enhanced PDCCH;
determine the DCI format type and whether additional bits are available in the DCI format; and
transmit the ACK or the NACK in an enhanced physical Hybrid Automatic Repeat Request (HARQ) indicator channel (PHICH).

49. The non-transitory computer-readable medium of claim 48, wherein the code to transmit the ACK or the NACK further comprises code to transmit the ACK or the NACK in a PHICH located in a control region when the grant is provided in the legacy PDCCH based on the DCI format type and the additional bits available in the DCI format.

* * * * *